United States Patent

Hahn et al.

[15] 3,648,733
[45] Mar. 14, 1972

[54] SPOOL VALVE HAVING ADJUSTABLE SEALS

[72] Inventors: Rea I. Hahn; Robert W. Broberg, both of Racine, Wis.

[73] Assignee: Spencer Hydraulic, Inc., Racine, Wis.

[22] Filed: Jan. 22, 1970

[21] Appl. No.: 4,803

[52] U.S. Cl. ....................................137/625.69, 251/172
[51] Int. Cl. ....................................................F16k 3/26
[58] Field of Search ............... 137/625.68, 625.69; 251/172

[56] References Cited

UNITED STATES PATENTS

| | | | |
|---|---|---|---|
| 3,451,430 | 6/1969 | Cowdin | 137/625.69 |
| 569,907 | 10/1896 | Zinn | 137/625.68 |
| 3,429,341 | 2/1969 | Sochting | 137/625.68 |
| 3,487,435 | 12/1969 | Sheardown | 137/625.69 X |

*Primary Examiner*—William R. Cline
*Attorney*—Arthur J. Hansmann

[57] ABSTRACT

A fluid flow control device including a housing having an inlet port and an outlet port and an intermediate chamber. A spool is slidably disposed in the chamber, and fluid seal rings are located in the chamber for fluid sealing with the spool. The seal ring is a resilient member which is flanked by compression members bearing inwardly on the ring to extrude the ring against the spool and against the housing wall defining the chamber, to fluid seal at those areas. The seal ring projects beyond the flanking compression members and towards the spool, and a threaded gland member acts upon the seal ring to compress it to the desired amount. Also, a check valve is operatively disposed in the housing and is actuated by the spool, and guide means are provided for acting on the spool and keeping the spool clear of the seat for the check valve so that the seat is not damaged in the movement of the spool. The spool has a taper for variable metering of fluid pressure in the release of fluid through the check valve. The entire fluid flow control device can be mounted in a plate which is serving as a mounting member with an electric motor on one side and a fluid pump on the other side of the plate.

10 Claims, 8 Drawing Figures

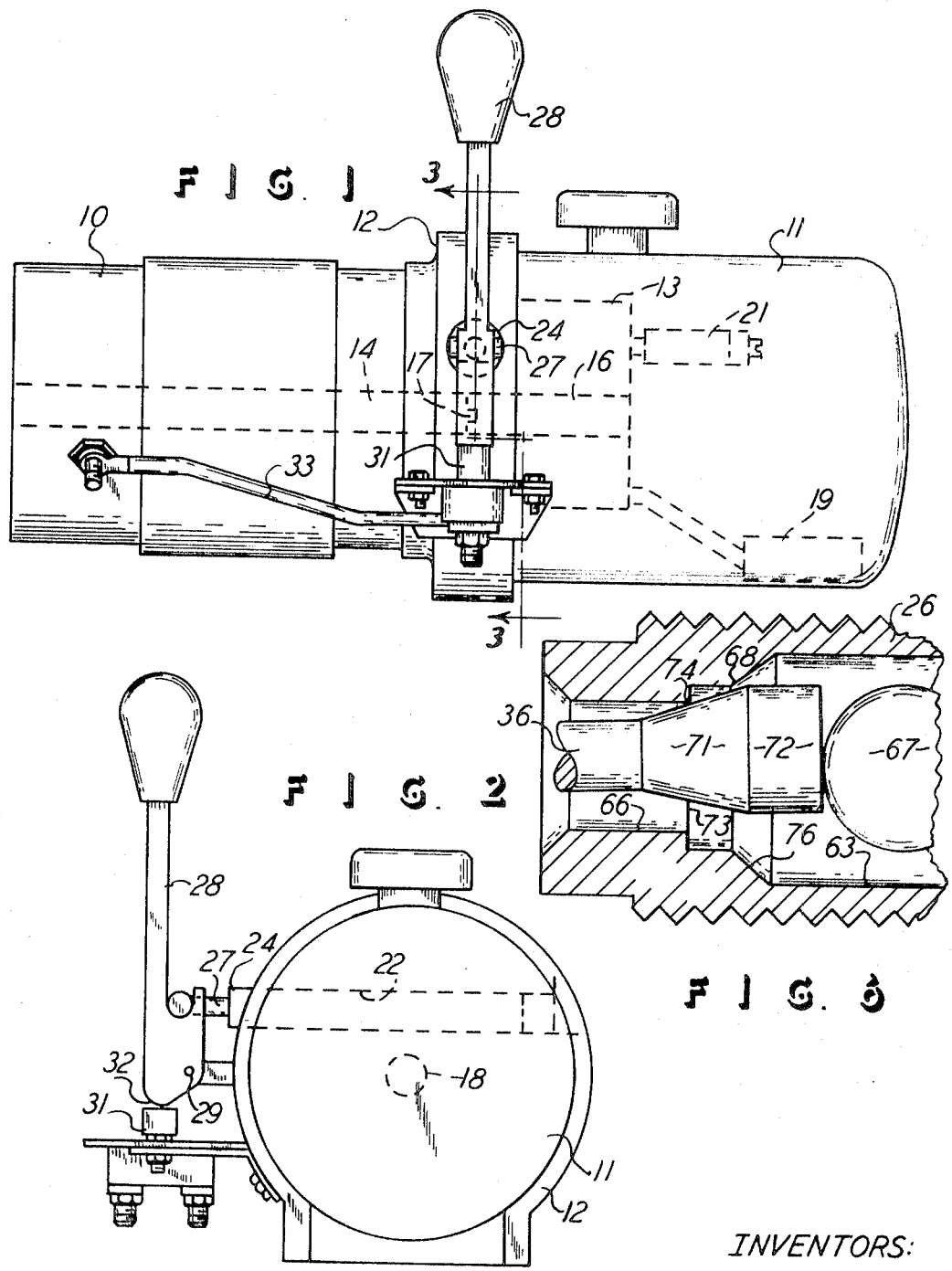

INVENTORS:
REA I. HAHN
ROBERT W. BROBERG

*Arthur J. Hanemann*
ATTORNEY

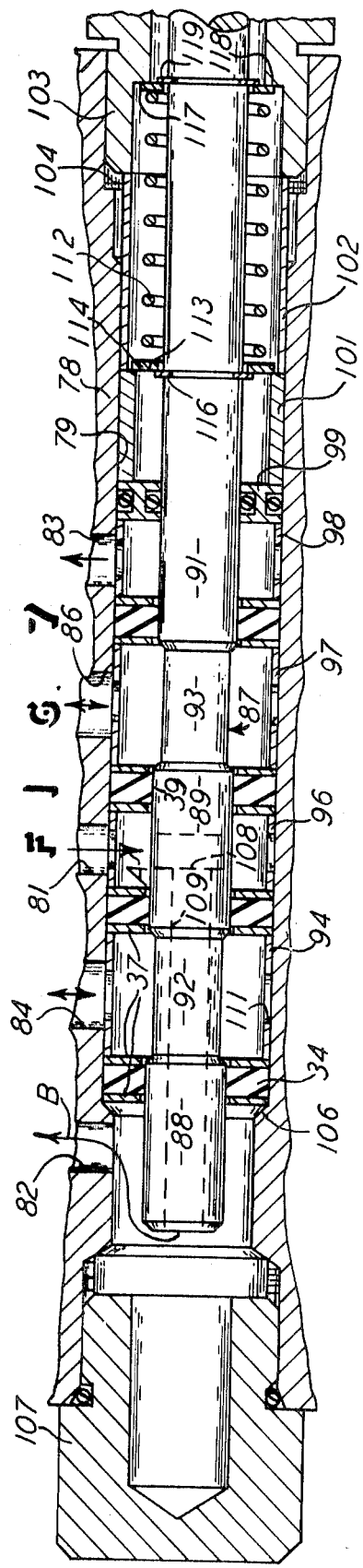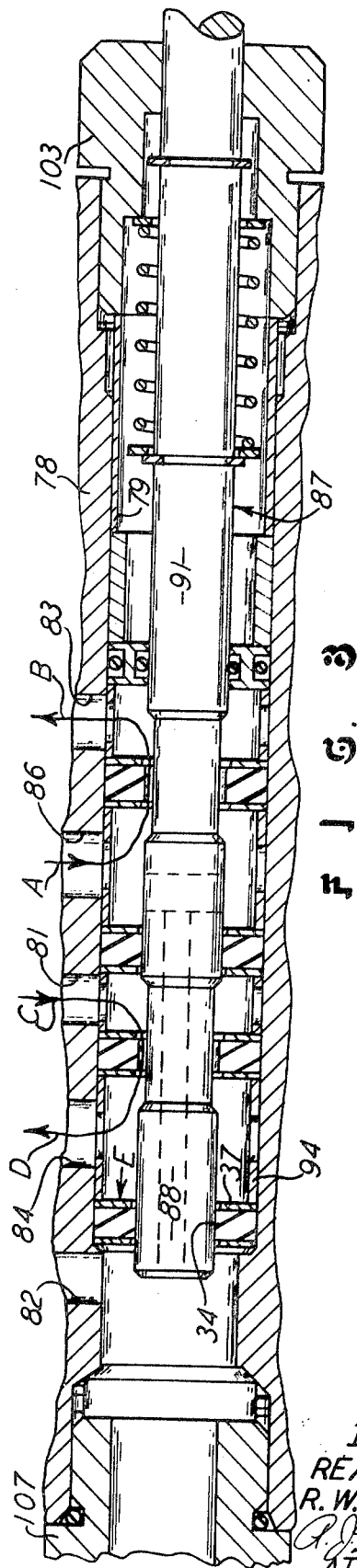
INVENTORS:
REA I. HAHN
R. W. BROBERG
ATTORNEY

SPOOL VALVE HAVING ADJUSTABLE SEALS

This invention relates to a fluid flow control device, and, more particularly, it is in the nature of a spool type of valve which has fluid-sealing members and a check valve. The particular features of this invention lend themselves to applications for multiple type valving, such as two-way and four-way valving. Further, the fluid flow control device or valve of this invention has particular application in conjunction with an assembly of an electric motor and a fluid pump driven by the motor, and a mounting plate for the motor and pump, with the plate serving as the housing for the fluid flow control device or valve of this invention, since the invention is suitable for that type of installation.

BACKGROUND OF THE INVENTION

Spool type valves are old and well known in the art of controlling fluid flow. Similarly, check valves, including those of the ball type which is shown in these drawings, are known in their general construction. Still further, the assembly of a driving unit, such as an electric motor, and a driven fluid pump, and an intermediate mounting plate, is also well known, such as shown in U.S. Pat. No. 2,930,322. Still further, the prior art is aware of seal ring structures which include a compressible member disposed between a housing wall and an inner slidable spool, and examples of such are shown in U.S. Pat. Nos. 2,320,905 and 3,308,851, both of which have a compressible type of seal.

In the present invention, it is significant that the fluid flow control device is located in the intermediate mounting plate utilized in the assembly of the electric motor and pump. With this arrangement, the entire assembly is of a minimum size and is economical and compact. Further, the assembly includes a spool type valve combined with a check valve, and the spool type valve or flow control device may be readily made up in a multiple valving unit, such as either a two-way or a four-way valve.

Other objects and advantages of this invention include the provision of an economical and compact fluid flow control device which does not require close tolerances, such as those provided by honing, grinding, lapping, or the like, but only ordinary machined surfaces are adequate for providing the device susceptible to flow control, even high pressure conditions. Also, the device compensates for variations in pressure, and for wear of its parts, and it efficiently operates though dirt and metal chips are in the fluid.

Other objects include the provision of the fluid flow control device which has the seal rings responsive to both mechanical and hydraulic pressures. In this regard, the seal rings are effective up to a range of high pressure of fluid, and the fluid itself will cause the seal to resist the passage of fluid even though the fluid is under high pressure. In conjunction with this, the fluid seals of this invention act on the valve spool only to the amount of mechanical pressure necessary to resist the degree of fluid pressure exerted on the seal. Therefore, under a low pressure condition, the seal is fully effective but yet the frictional force between the seal and the spool is only a minimum. Also, the seal of this invention is of a material which automatically responds to the fluid medium of oil to enlarge itself so that it will be in efficient fluid-sealing relationship with the spool and other parts adjacent the seal.

Another object of this invention is to provide a spool type of fluid flow control device which also includes a ball type check valve, and with the arrangement being such that the spool is axially movable to unseat the ball, but the spool is prevented from contacting the seat for the ball so the ball seat cannot be damaged. This feature is accomplished in connection with the aforementioned objectives, including the provision of the ring type of seal member which permits the spool to slide axially of the ring, and the spool is therefore in the nature of a cantilever or extended member projecting beyond the location where the ring gives sliding and radial support to the spool.

Still further, the spool and seal ring are inter-related so that the spool can be subjected to a spring type pressure for returning the spool to a neutral position at any time when mechanical force is released from the spool. This object is accomplished by the relationship between the sealing ring and the spool; and such relationship including the aforementioned features of fully efficient fluid sealing, but with low frictional force, so that the spring can axially move the spool in sliding contact with the seal rings, as desired.

Another object is to provide a fluid flow control device of the type and advantages mentioned, and to have the check valve arrangement in conjunction with a valve release which meters the release of fluid pressure in variable and selectable amounts, according to the axial position of the spool itself. Also, in this arrangement, the spool acts against the hydraulic pressure being retained, so the spool cannot be rapidly displaced, and therefore the metering can be accurately accomplished, as desired.

Still further, the present invention provides a fluid control device of the spool type, and with the arrangement providing for fluid-pressure balancing of the spool when the spool is at least in the position for permitting fluid pressure to pass through the device. In accomplishing this object, the spool therefore need not be moved or held against the force created by the fluid pressure.

Further objects and advantages will become apparent upon reading the following descriptions and upon viewing the accompanying drawings.

BRIEF DESCRIPTION OF THE DRAWINGS

FIG. 1 is a side elevation view of the assembly of the electric motor and fluid pump and their intervening mounting plate.

FIG. 2 is a right end view of FIG. 1.

FIG. 6 is a view of a fragment of FIG. 4, and with parts thereof in different positions.

FIG. 7 is a longitudinal sectional view of the spool type of valve shown in FIG. 3, but with the valve of FIG. 7 incorporating more seals, passageways, and the like.

FIG. 8 is a view similar to FIG. 7, but with the spool in a different position from that shown in FIG. 7.

DETAILED DESCRIPTION OF THE PREFERRED EMBODIMENTS

Figure 3:
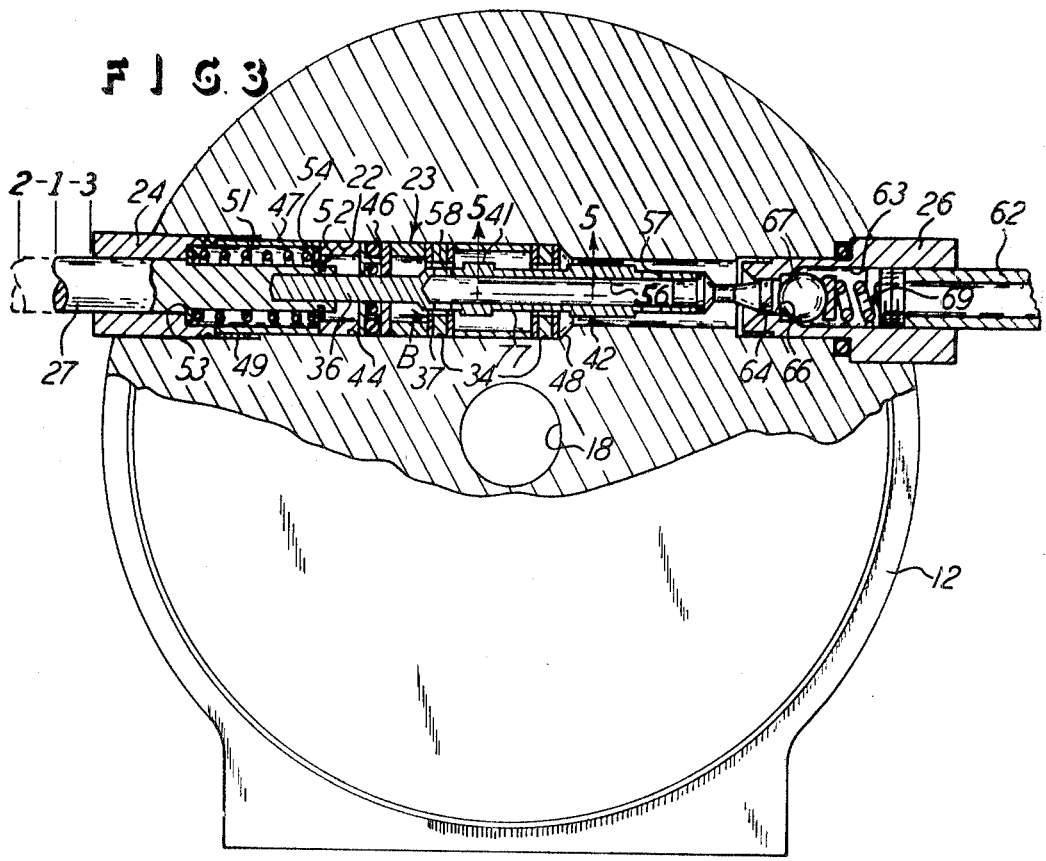
FIG. 3 is an enlarged view of the plate of FIG. 1, and with parts removed therefrom and with the view taken in section and substantially along the line 3—3 of FIG. 1.

FIG. 1 shows an electric motor 10 and a tank or fluid reservoir 11 and an intermediate mounting plate 12. A fluid pump 13 is shown in dotted lines, and the pump is enclosed by the tank 11 which of course abuts the plate 12, as does the pump 13. The motor 10 has a shaft 14, and the pump 13 has a shaft 16, and the two shafts 14 and 16 are axially aligned and are shown coupled together at 17. FIG. 3 shows that the mounting plate 12 has a central opening 18 through which the shafts 14 and 16, or their coupling member, can pass so that the motor 10 can drive the fluid or hydraulic pump 13. A pump intake member 19 is shown in the tank 11, and also a pump relief valve 21 is attached to the pump 13 and is shown in the tank 11.

FIGS. 1 and 2 show that the mounting plate 12 has a bore 22 extending therein, and it will hereinafter be also seen that the fluid flow control device or valve of this invention is disposed within the bore 22. FIG. 3 more clearly and accurately shows the bore 22 and the fluid flow control device generally designated 23. End glands 24 and 26 extend into the bore 22 for fluid sealing the bore 22, and for reasons mentioned later. Also a control stem 27 extends through the gland 24 and is suitably connected to a control lever 28 pivotally mounted on a pin 29 supported by the mounting plate 12. Thus, pivoting of the lever 28 about the pin 29 axially displaces the stem 27, and consequently displaces the working parts of the valve, as described later. Further, an electric switch 31 is mounted on the plate 12 and disposed below the lever 28 to be engaged by the lever end 32 when the lever end is pivoted. The switch 31 has an electric connection 33 extending to the motor 10, such that upon pivoting the lever 28, the switch 31 is actuated to energize the motor 10 and to therefore drive the fluid pump 13. When the lever 28 is in the position shown in FIGS. 1 and 2, it is in the neutral position and the motor 10 and pump 13 are not operating. However, when the lever 28 is pivoted counterclockwise about the pin 29, relative to FIG. 2, then the switch 31 is closed and the motor 10 and pump 13 operate, and such operation is in correspondence with the positioning of the valve 23 within the plate bore 22, so that fluid pressure can be released through the valve 23 when the motor 10 and pump 13 are operating.

The fluid control device 23 includes the fluid seal rings 34 and the axially movable spool 36. The spool 36 is suitably connected to the stem 27, so that the spool moves in response to the pivotal motion of the lever 28. FIG. 3 shows that there are two seal rings 34, and each ring 34 is flanked by two washers 37 which are annular or ring-shaped, similar to the shape of the seal rings 34, but preferably of a slightly larger internal diameter at the location designated 38 in FIG. 5 which also shows the internal circumference designated 39 on the seal ring 34. Thus the smaller internal diameter for the seal ring 34 presents the ring in sliding contact with circularly shaped raised surfaces 41 and 42, which are spaced apart along the spool 36. That is, the diameters of the surfaces 41 and 42 are substantially the same as the internal diameters of the rings 34 so that the surfaces 41 and 42 fluid seal with the respective rings 34 when the spool 36 is moved to the left from the position shown in FIG. 3.

FIG. 3 therefore shows the spool 36 in a position designated position No. 1 in FIG. 3 at the left end of the stem 27 in FIG. 3. When the stem 27 and the spool 36 are moved to the left from the position shown in FIG. 3, that is when they are moved to the position designated No. 2 in FIG. 3, then the sealing surfaces 41 and 42 are disposed inside the respective seal rings 34, as mentioned.

Also disposed within the housing bore or chamber 22 is a tube 43, and two other tubes 44 and O-ring unit 46 are disposed therein also, and the tubes 43 and 44 are spacers.

Finally, a tube 47 is disposed within a bore 22, and the tubes and seals and washers mentioned all form a stack of members in axial alignment, as shown in FIG. 3. The bore 22 presents a shoulder 48, for limiting axial movement of one end of the stack of described members, and the gland 24 abuts the other end of the stack of members, as shown in FIG. 3. It will therefore be understood that the gland 24 is threaded into the bore 22 which has threads 49, and thus the gland 24 can be used to effect and to adjust mechanical pressure on the stack of members, and particularly to set and adjust the axial mechanical pressure applied to the sealing members 34. The members 34 are therefore of a resilient material, and a plastic material, such as the material commonly known as Teflon, is found to be most useful as the material for the seal rings 34 since this material is tough, makes good sealing contact with the adjacent metal of both the wall defining the bore 22 and the large circular surfaces 41 and 42 on the spool 36, and the plastic material is suitable for low friction relationship with the surfaces 41 and 42 so that the spool can easily slide thereon. Also, the material for rings 34 is capable of having dirt, metal chips, and other debris embedded therein without affecting the fluid sealing efficiency of the rings 34.

FIG. 3 further shows a compression spring 51 is disposed between the gland 24 and a ring 52 on the stem 27 so that the spring 51 can urge the spool 36 to the right and left, and normally to the position shown in FIG. 3, and designated No. 1. Further, when the spool 36 is moved to the right, such as to the position No. 3 of FIG. 3, the spring 51 bears against a shoulder 53 on the stem 27 to urge the spool back toward the left in FIG. 3. Finally, when the spool is moved to the left, such as to the position No. 2 in FIG. 3, the spring 51 will again be initially compressed, this time by the ring 52 acting on a larger ring 54, and, when moving force is released from the stem 27, the spring 51 will return the spool 36 to the FIG. 3 position which is the neutral position for the device.

Figure 4:
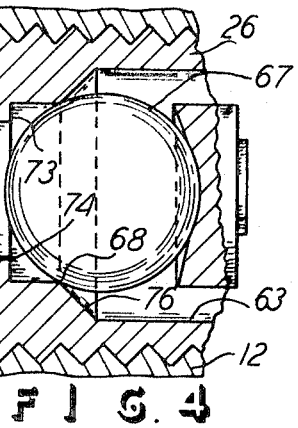
FIG. 4 is an enlarged view of a fragment of FIG. 3, and showing the check valve portion thereof.
Figure 5:
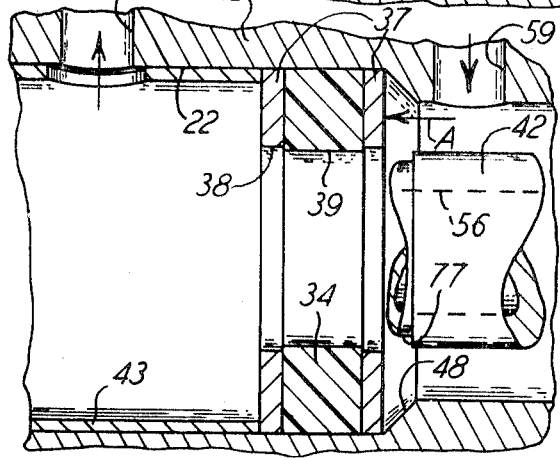
FIG. 5 is an enlarged view of a fragment of FIG. 3, and with the view being a sectional view taken along the line 5—5 of FIG. 3.

FIGS. 4 and 5 show some of the detail described in relation to FIG. 3, and FIGS. 7 and 8 also show detail relative to a spring which has end washers, such as the arrangement of the spring and washers described in connection with FIG. 3, so the disclosure is fully apparent. FIG. 3 further shows that the spool 36 has a fluid passageway 56, and a fluid port 57 and a fluid port 58 are in fluid-flow communication with the passageway 56 and with the housing chamber or bore 22. FIG. 5 further shows that the housing piece 12 has a fluid inlet port 59 and a fluid outlet port 61, both of which are on the side of the plate 12 and are in fluid-flow communication with the fluid pump 13. Thus pump 13 would pump fluid into the port 59, and therefore into the housing chamber 22. In the spool position in FIG. 3, the inlet fluid from the pump 13 would then flow around the spool 36, and it would also flow through the spool passageway 56, and this inlet fluid could then flow out the outlet port 61 and back to the reservoir or tank 11, and the spool 36 is therefore in the neutral position, as mentioned. However, with the spool 36 placed in the position No. 2, that is to the left from the position shown in FIG. 3, then the large circular sealing surfaces 41 and 42 respectively seal with seals 34, and fluid coming through the inlet port 59 cannot get to the outlet port 61, so the fluid is then pumped through the valve and ultimately to a connection 62 which may extend to a hydraulic cylinder or any other device to be powered by the assembly shown and being described. That is, the gland 26 has a fluid passageway 63 which conducts fluid from the chamber 22 and to the connection or pipe 62.

In the No. 1 or neutral position described, it will be seen that the spool 36 has an axial end 64 which is cylindrical and relatively snugly disposed in a cylindrical opening 66 in the member 26. In the No. 2 position of the spool 36, the spool end 64 is moved to the left and therefore out the opening 66 so that unrestricted fluid flow can go through the opening 66 and to the connection 62. Further, in the pumping or No. 2 position, it will be understood that the spool port 58 is disposed within the tubular piece 44, and the spool sealing surface 41 is also disposed in sealing relation with the left-hand ring 34 so that fluid cannot move through the port 58 and to the outlet port 61. Under these conditions, pressure is exerted on both the internal passage 56 and the external and axially projected areas of spool 36, up to the O-ring unit 46, at which point the pressure is sealed along the minor diameter of spool 36. The interior passageway 56 is balanced hydraulically as the opposite ends of the passageway are equal in area. However, the external areas of spool 36 are hydraulically unbalanced to the extend of the small shoulder on the spool and adjacent the washer 37. This unbalance is minimized by incorporating a minimum spool diameter at that area, yet that spool diameter is structurally adequate to perform the valving functions herein described.

Furthermore, for the fluid pressures intended, the design geometrics thus incorporated result in a hydraulic unbalance which is less than the forces exerted by spring 51, in spool position No. 2, thereby enabling a spring 51 to overcome the hydraulic unbalance and move spool 36 back to neutral position No. 1.

FIGS. 3, 4, and 6 show a check valve, which is specifically shown as a spherical or ball check member 67 disposed within the passageway 63. A circular valve seat 68 is formed in the member 26 for fluid tightly seating the ball 67 on the seat 68 to prevent back flow from the connection 62 and to the left in the drawings as shown. However, when the spool 36 is moved to the right, or to the position No. 3 of FIG. 3, then the spool end 64 abuts the ball 67 and moves it off the seat 68 so that the fluid can flow back to the left in FIG. 3. A compression spring 69 urges the ball 67 onto the seat 68.

An important feature in connection with the check valve arrangement is the fact that the spool has a tapered portion, designated 71, adjacent the axial end portion 64, and there is also a cylindrical portion 72 of the spool 36, and it is actually the portion 72 which is slidably guided in the cylindrical opening 66. However, when the spool is moved to unseat the ball 67, the tapered portion 71 moves into the area of the ball seat 68 and across the plane of a circular shoulder 73 on the member 26, as shown in FIG. 6. This therefore provides the fluid passageway past the ball 67 and past the spool portions 71 and 72 and through the cylindrical opening 66 as desired. However, depending upon the axial position of displacement of the spool 36, the tapered portion 71 serves as a metering means for controlling the amount of opening in the passageway 66 and around the spool end described. Of course the further to the right the spool 36 is stroked or displaced, the more the flow of fluid in the releasing function mentioned.

Another important feature with regard to the tapered check valve arrangement described is in conjunction with the relationship between the circular seat 68 and the circular shoulder 73 and the position of the taper 71 and the shape of the taper 71. That is, FIG. 6 shows an extreme condition of radial offset of the spool end, and it will be understood that the spool end is supported in a cantilever or overhang fashion and the near seal 34 is the only other radical guide for the spool end which therefore may be inclined to move radially, as exaggerated in FIG. 6. However, even with such radial movement as shown, the spool end will not be able to contact the circular seat 68, since the corner 74 of the circular shoulder 73 will engage the portion of the spool adjacent it, such as the tapered conical portion 71, and there will be spacing between the spool and the ball seat 68 to protect the latter from damage. To accomplish this, it will be seen that the angle defined on one side by the line between the corner 74 of the shoulder 73 and the seat 68 is greater than the angle of the spool taper 71. Further, FIG. 4 shows that the relationship of the seat 68 and the shoulder 73 is such that the seat 68 is larger than the diameter 74 defining the shoulder 73, and the geometry, as shown, is such that the ball 67 extends across the plane of the shoulder 73. Still further, the diameter of the circular opening 66 is the same as the diameter of the corner 74, and is smaller than the diameter of the circular seat 68. Also, a conical portion 76 is provided in the piece 26 adjacent the circular seat 68 so that the ball will be readily guided to its seated position as it moves from right to left in the directions of the drawings.

FIG. 3 therefore shows a two-way type of flow control device or valve 23 having the sealing rings 34 and the tapered release and check valve described. It will be seen that the rings 34 are responsive to mechanical pressure created by the adjusted threaded position of the gland 24 causing the resilient seal rings 34 to be extruded relative to their flanking compression members, including the washers 37. An important point is that the washers 37 project beyond the pieces adjacent to and in contact with the washers 37, such as the tube 43 and tube 44, so that the washers 37 are exposed to fluid pressure acting axially of the bore 22 and therefore axially on the ring shaped washers 37. That is, with the spool 36 in the pumping or position No. 2, the spool sealing surface 42 would be in fluidtight relationship with the ring inner surface 39, and there would be fluid pressure acting axially on the washer 37, such as the pressure designated A in FIG. 5. The fluid pressure therefore would further compress the sealing ring 34 and cause it to be self sealing in accordance with the amount of pressure A, so that the entire valve would be desirably fluid tight, both on the spool surface 42 and in the bore 22. The same action would take place with respect to the ring 34 on the left in FIG. 3, when the spool circular portion 41 is in contact with the left-hand ring 34 and is fluid sealing therewith. That is, high pressure would enter the spool port 57 and passageway 56 and go through the spool port 58 and act on the left-hand ring 34 by virtue of the pressure arrow designed B in FIG. 3, and such pressure would cause the left-haNd ring 34 to also be self sealing and to seal in proportion to the amount of pressure exerted by the fluid. Thus the portion of the stack including the tube 43 and the two sealing rings 34 and the four washers 37 on opposite sides of the tube 43 would form one sub-assembly subjected to the fluid pressure in opposite directions and such arrangement makes for completely efficient sealing under the influence of the hydraulic pressure itself. It will also be understood, as mentioned and shown in FIG. 5, the ring 34 projects inwardly beyond the inner surface 38 of the washers 37, and the amount of projection can vary according to the desired conditions. That is, where the ring is to be used for high pressure, the projection amount may be slight, but where the ring is to be used for lower pressure, the projection amount can be greater and, in any instances, the sealing ring 34 will permit sliding motion of the spool and will also efficiently fluid seal with the spool, Also, under different requirements, the converse of the diametrical comparisons may be utilized. It will also be appreciated that the spool 36 has smaller circular surfaces 77 in alternate arrangement with the larger surfaces 41 and 42. Therefore, in the No. 1 position, the seal rings 34 are not at all in contact with the spool 36, and flow of fluid is permitted past the seal members, as desired at that point. However, because of the seal arrangement and the different diameters or sizes of circular surface described relative to the spool 36, the seal ring will not be pressurized out of its position, by fluid or by mechanical pressure, such as would be the case if the rings 34 were simply ordinary O-rings.

FIGS. 7 and 8 show the seal ring and spool portion of the invention, and the unit shown is a four-way type of valve or fluid pressure device, and here it is described as having a housing 78 with a chamber 79 and an inlet port 81. There are two sump or outlet ports 82 and 83, and there are two additional ports 84 and 86 which lead off to suitable connections with each connection serving a hydraulic cylinder or the like, which is not shown. Thus FIG. 7 shows a spool 87 having the large circular portions 88, 89, and 91 and having the reduced or small circular portions 92 and 93. The large portions are shown to be in sealing contact with the resilient seal rings 34, in the FIG. 7 position of the spool 87, and again the seal rings 34 are flanked by the compression washers 37. Also, intervening tube members 94, 96, 97 and 98 are shown flanking the seal members, and a conventional type seal 99 and compression tubes 101 and 102 are also shown. Thus a gland 103 is threadable within the housing 78 which has the threaded opening and threads 104, so that the gland 103 can apply axial pressure to the tube stack and seals described and shown, to force the stack to the left in FIG. 7 and against the shoulder 106 of the housing 78 for extruding or squeezing the seals 34, as described previously.

Also, an end member or nut 107 closes the end of the housing bore or chamber 79. Finally, the spool 87 may have a fluid opening 108 and a fluid passageway 109, both of which permit fluid to go from the inlet port 81 and to the outlet or sump port 82, as shown by the arrows designated A and B in FIG. 7. Further, it will be seen that the compression tubes described all have fluid openings therein, such as the opening 111 shown in compression tube 94. Thus, fluid can go from all of the ports described in the housing 78 and into the working chamber or bore 79, as is apparent.

Finally, the compression spring 112 is shown in the spool neutral position of FIG. 7, and the spring abuts a large washer 113 which in turn can abut the end 114 of the tube 101 and can abut the ring 116 affixed to the spool 87. The other end of the spring 112 abuts a large washer 117 which abuts a shoulder 118 on the gland 103, and, the washer 117 abuts a ring 119 on the spool. Therefore, the spring 112 and the described washers on opposite ends thereof are the same as the spring arrangement shown in FIG. 3, and the spring urges the spool 87 back to the neutral position, but it still permits the spool to move into the left and to the right, from the position shown in FIG. 7.

Thus, FIG. 8 shows the spool 87 moved to the right, and, in this position of FIG. 8, fluid will flow in the direction of the arrow A and through the port 86 and in the direction of the arrow B and through the port 83, so that a hydraulic cylinder or the like which would be connected to the port 86 would be relieved of fluid pressure as the flow returns to the sump. Also in the spool position of FIG. 8, fluid coming into the inlet port 81 and in the direction of the arrow C would flow into the port 84 in the direction of the arrow D, and a hydraulic cylinder connected with the port 84 would therefore be operated, or pressurized as desired. Therefore, in the FIG. 8 position of the spool 87, one cylinder connected to the port 86 would be relieved of pressure while another cylinder connected to the port 84 would be pressurized.

Further, it will be apparent that if the spool 87 were moved to the left from the position of FIG. 7, the port 86 could be pressurized while the port 84 could be relieved of pressure. Just as in the arrangement shown in FIG. 3, when a sealing member 34 of FIG. 8, such as the member 34 on the extreme left in FIG. 8, is under pressure by hydraulic fluid acting in the direction of the arrow designated E, it can be considered that the compression washer 37 is free to move against the ring 34 and extrude the ring 34 against the spool large sealing surface 88. That is, the washers 37 are considered to be free in the assembly for the purpose of moving inwardly on the sealing ring 34. Also the adjacent tubes, such as the tube 94 are compression members but their annularly shaped area of contact with the adjacent washers 37 is less than the areas of contact of the washers 37 with the ring 34, so the washers 37 are subjected to the external hydraulic pressure and therefore permitted to squeeze the ring 34, as mentioned. In both embodiments described, the sealing rings 34 are of a resilient material compressible by the mechanical and hydraulic forces. Upon relief of these forces, the rings 34 will resume their original size.

What is claimed is:

1. A fluid flow control device comprising a housing having a fluid inlet port and a fluid outlet port and a chamber, a spool slidably disposed in said chamber and having a circumferential fluid-sealing surface extending around said spool for a limited length of said spool, a resilient and mechanically and hydraulically compressible fluid seal ring disposed in said chamber and having a circumferentially fluid-sealing surface in contact with and of the diameter of said fluid-sealing surface on said spool for mating with the latter and fluid sealing therebetween, a spool actuating means for moving said spool to a position where said fluid-sealing surface is out of contact with said fluid seal ring, a first compression member in contact with one end of said fluid seal ring and being freely disposed in said chamber and being exposed to the fluid pressure in sach chamber on the axial end of said first compression member away from said fluid seal ring and being movable toward said fluid seal ring under the influence of the fluid pressure, a second compression member in contact with said axial end of said first compression member at the radial outer edge thereof and being discrete relative to the latter and being of an area less than that of said first compression member at the area of contact therebetween for exposing said axial end of said first compression member to the fluid pressure in fluid pressurizing said fluid seal ring and for transmitting mechanical pressure to said fluid seal ring through force from said compression members, and an adjustable threaded member movably disposed in said housing on the axis of said compression members and at the axial end of said second compression member opposite the location of said first compression member, said housing and said adjustable member being threaded together with space therebetween in the axial direction from said adjustable member toward the other said members for adjustable movement of said adjustable member toward the other said members in applying the mechanical force.

2. The subject matter of claim 1, wherein the ends of said compression members at said area of contact between said compression members are of two different overall sizes, and with said end of said second compression member being smaller in overall size than the overall size of said end of said first compression member, for exposing said end of said first compression member to fluid pressure.

3. The subject matter of claim 1, wherein said compression members are cylinders throughout the entire lengths of both in the direction of contact therebetween, and with said second compression member being of a lesser overall area on its end of contact than is the overall area of said first compression member on its end of contact, for exposing said end of said first compression member to fluid pressure.

4. The subject matter of claim 1, wherein said spool extends through said fluid seal ring, said fluid seal ring having a continuous planar surface extending radially thereof along its axial end adjacent said first compression member, said first compression member being a cylindrically shaped washer having a continuous planar surface on the axial end thereof in contact with said planar surface of said fluid seal ring and having an internal diameter greater than the internal diameter of said fluid seal ring to have the latter extend beyond said washer and into contact with said fluid-sealing surface of said spool, and said second compression member being cylindrically shaped throughout its entire length and having an internal diameter greater than the internal diameter of said washer, for exposing said end of said washer to fluid pressure.

5. The subject matter of claim 1, wherein said spool extends through said fluid seal ring and is cylindrical in shape and has alternate large and small circular surfaces extending along the axial length of said spool, said spool fluid-sealing surface existing on each of said large circular surfaces, a plurality of said fluid seal rings, one of said fluid seal rings for each of said large circular surfaces and with the latter being in fluid-sealing contact with the internal circular surface of the respective one of said fluid seal rings, said fluid seal rings being spaced along said chamber and said spool being movable along said chamber and said spool large and small circular surfaces being spaced along said spool, all for axial displacement of said large circular surfaces out of contact with said fluid seal rings upon axial movement of said spool, and with said inlet port and said outlet port being at opposite axial ends of at least one of said fluid seal rings.

6. The subject matter of claim 5, wherein said first compression member is a cylindrically shaped washer having an internal diameter greater than the internal diameter of said fluid seal ring, to have the inner circular surface of said internal diameter of said first compression member spaced radially outwardly from said large circular surfaces on said spool.

7. The subject matter of claim 6, wherein there is one of said inlet port and there are a plurality of said outlet ports, two of said seal rings on opposite sides of said inlet port for fluid sealing beyond said two seal rings and relative to said inlet port and along said large circular surface of said spool, and there being one of said fluid seal rings between every two of said outlet ports for fluid sealing between said outlet ports and along said large circular surface of said spool.

8. The subject matter of claim 7, including a spring operative on said spool for yieldingly axially urging said spool to a position where said large circular surfaces are in contact with said fluid seal rings.

9. The subject matter of claim 7, wherein said spool has a fluid passageway extending from one of said circular surfaces to one axial end of said spool, one of said outlet ports being located to be in constant fluid flow communication with said passageway, and with said passageway being in fluid flow communication with said inlet port in one axial position of said spool 10. The subject method claim 6, including a spring operative on said spool for yieldingly axially urging said spool to a position where said large circular surface is in contact with said fluid seal ring.

* * * * *